US012769904B2

(12) United States Patent
Anand

(10) Patent No.: US 12,769,904 B2
(45) Date of Patent: Oct. 20, 2026

(54) SYSTEM AND METHOD FOR OPTIMIZING BILL OF MATERIAL COST AND POWER PERFORMANCE OF PLATFORM SYSTEM-ON-CHIP IN MOBILE DEVICES

(71) Applicant: TriSpace Technologies Pvt Ltd., Bangalore (IN)

(72) Inventor: Narasimhan Vijay Anand, Bangalore (IN)

(73) Assignee: TriSpace Technologies Pvt Ltd., Bangalore (IN)

( * ) Notice: Subject to any disclaimer, the term of this patent is extended or adjusted under 35 U.S.C. 154(b) by 911 days.

(21) Appl. No.: 18/173,351

(22) Filed: Feb. 23, 2023

(65) Prior Publication Data

US 2023/0376649 A1 Nov. 23, 2023

(30) Foreign Application Priority Data

May 17, 2022 (IN) ............................ 202241028403

(51) Int. Cl.
*G06F 30/20* (2020.01)
*G06F 113/18* (2020.01)
*G06F 119/18* (2020.01)

(52) U.S. Cl.
CPC .......... *G06F 30/20* (2020.01); *G06F 2113/18* (2020.01); *G06F 2119/18* (2020.01)

(58) Field of Classification Search
CPC .. G06F 30/20; G06F 2113/18; G06F 2119/18; H04N 19/117; H04N 19/42; H04N 19/44; H04N 19/70; H04N 19/80; H04N 19/82
See application file for complete search history.

(56) References Cited

U.S. PATENT DOCUMENTS 10,390,309 B1 * 8/2019 Anand .............. H04W 52/0261
11,330,526 B2 5/2022 Anand
2004/0181564 A1 9/2004 MacInnis et al.
(Continued)

FOREIGN PATENT DOCUMENTS

IN 202041024982 A * 6/2020 ............ H04W 52/02

OTHER PUBLICATIONS

Intellectual Property India, First Examination Report issued in corresponding foreign application IN202241028403 on Aug. 17, 2022, 6 pages.

(Continued)

*Primary Examiner* — Chuen-Meei Gan
(74) *Attorney, Agent, or Firm* — J. Peter Paredes; Amin Wasserman Gurnani LLP

(57) ABSTRACT

The present invention provides a system and method for optimizing BoM cost of platform SoC in mobile devices. The system (100) comprises a CPU with SIMD extensions wherein video codec encoder/decoder module is implemented (101), and another CPU with SIMD extensions instead of DSP/VLIW core wherein post-processing filtering module (Deblocking filter) (102) module is implemented. Replacing DSP/VLIW core in platform SoC helps in lowering the BoM cost and the inventive steps helps in achieving bit-exact results overcoming the limitations of CPU ISA as against DSP ISA. The power consumed is either case (deblocking filter on CPU, DSP ISA) is the same, thus giving value additions to platform SoC designers and makers.

5 Claims, 3 Drawing Sheets

(56) References Cited

U.S. PATENT DOCUMENTS

| | | | | |
|---|---|---|---|---|
| 2007/0071106 A1* | 3/2007 | Graham | G06F 13/28 | 375/E7.176 |
| 2013/0343466 A1* | 12/2013 | Stojancic | H04N 19/80 | 375/240.24 |

OTHER PUBLICATIONS

Stolberg, H-J. et al. "HiBRID-SoC: A Multi-Core SoC Architecture for Multimedia Signal Processing", Journal of VLSI Signal Processing, 41, 9-20, 2005.

* cited by examiner

SYSTEM AND METHOD FOR OPTIMIZING BILL OF MATERIAL COST AND POWER PERFORMANCE OF PLATFORM SYSTEM-ON-CHIP IN MOBILE DEVICES

CROSS-REFERENCE TO RELATED APPLICATIONS

The present application claims priority to Indian patent application serial no. IN 202241028403, filed May 17, 2022, herein incorporated by reference in its entirety.

DESCRIPTION OF THE INVENTION

Technical Field of the Invention

The present invention relates to a system and method for optimizing Bill of Material (BoM) cost and power-performance in platform System-On-Chip (SoC) of mobile devices. More specifically, the present invention relates to optimizing BoM cost of platform SoC in mobile devices by implementing in-loop filtering/post-processing filtering (Deblocking filters) on a Central Processing Unit (CPU) with Single Instruction Multiple Data (SIMD) extensions instead of implementing on a Digital Signal Processor (DSP) core, thus avoiding need for DSP core on the platform SoC which takes more chip area than the CPU.

Background of the Invention

In-loop filtering (Deblocking filtering) in video communication adds to coding efficiency, and improves quality of compressed video at same bitrate. There are different video codecs which use in-loop filtering for the above reason.

Video communication involves encoding and decoding of digital video data. There are various video compression standards such as MPEG-1, MPEG-2, MPEG-4, H.264, H.265, H.266, AV1, VP8, VP10 and many more upcoming standards. The recent ones have adopted in-loop deblocking filter as part of codec processing. Deblocking filter is computationally intensive and accounts for almost one-third of codec computation complexity. The computational complexity of processing the deblocking filter modules takes lot of processing cycles, and hence consume lot of current while the video encoder/decoder is running during video communication in the battery driven gadget/device such as smartphone mobile.

The high loading of processor in video communication causes lot of power consumption, as a result the battery life of device usage is drastically reduced in video communication.

The DSP core Instruction Set Architecture (ISA) has saturation logic in built into each instruction as well as providing SIMD extensions. The saturation logic in each instruction cost few hundreds/thousands of Gates which increase the chip area and BoM cost of Platform SoC. CPU core ISA has only SIMD extensions and lacks saturation logic except for three instructions namely ADD, SUB and a dedicated SAT instruction. The power consumption in implementing with this limitation of ISA and getting bit-exact results on CPU as compared to DSP is challenging. This invention achieves results of implementing in-loop filtering module on CPU whilst achieving same power performance and lowering BoM cost by replacing DSP core with CPU core in platform SoC.

The U.S. patent document U.S. Ser. No. 10/390,309 titled "System and method for optimizing power consumption in mobile devices" discloses a method and apparatus for optimizing power consumption in mobile devices by suitable Instruction Set Architectural feature changes and optimal implementation of speech codecs. However, the solution is aimed at primary targeting the voice call use case.

The U.S. patent document U.S. Ser. No. 11/330,526 titled "System and method for optimizing power consumption in video communication in mobile devices" discloses a method and apparatus for optimizing power consumption in mobile devices by suitable Instruction Set Architectural feature changes and optimal implementation of video codecs. However, the solution is aimed at power optimization of the video call use case.

SUMMARY OF THE INVENTION

The present invention overcomes the drawbacks in the prior art and provides a system and method for optimizing BoM cost and power-performance of platform SoC in mobile devices.

The system comprises multiple CPU with SIMD extensions in the platform SoC. A camera integrated with the mobile device, captures input video and converts into digital video with typical pixel size of 8 bits. Nowadays higher resolution camera sensor is available which can capture pixel size of 10 bits.

In an embodiment of the invention, digital video signal is encoded according to compression standards H.264 or any other suitable standard for application. The various encoding tools such as Intra prediction, Motion Compensation, Variable Length coding are implemented in a CPU with instruction set having SIMD extension but without critical single cycle instruction Multiply and Accumulate (MAC). The in-loop/post processing modules (deblocking filter) is implemented on a CPU instead of DSP. The current consumption in the System-On-Chip (SoC) is same in either case, but has added advantage of lowering BoM cost with CPU instead of DSP.

The system also includes video codec decoder. The video codec decoder module is configured to decode the compressed video signal. The decoded video signal is then post processed using deblocking filter module. The post processing modules are implemented in a CPU instead of DSP/VLIW core.

Thus, the present invention provides method to optimize the BoM cost of platform SoC while still achieving same power consumption in a video call in mobile devices as against platform SoC having DSP core.

The need for DSP core in platform SoC is replaced with CPU core thereby reducing BoM cost of platform SoC.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

In order to more clearly and concisely describe and point out the subject matter of the claimed invention, the following definitions are provided for specific terms, which are used in the following written description.

The present invention provides a system and method for optimizing BoM cost of platform SoC and power-performance in mobile devices. The system comprises a CPU with SIMD extensions wherein, a video codec encoder, a video codec decoder is implemented, another CPU with SIMD extensions wherein in-loop filtering/post processing modules (deblocking filter) is implemented. The pipelined implementation of video codecs and post-processing modules (deblocking filter) in CPU with SIMD extension instead of DSP/VLIW respectively results in up-to several thousand logic gates reduction in platform SoC compared to implementation of all the module on DSP/VLIW processor.

Figure 1:
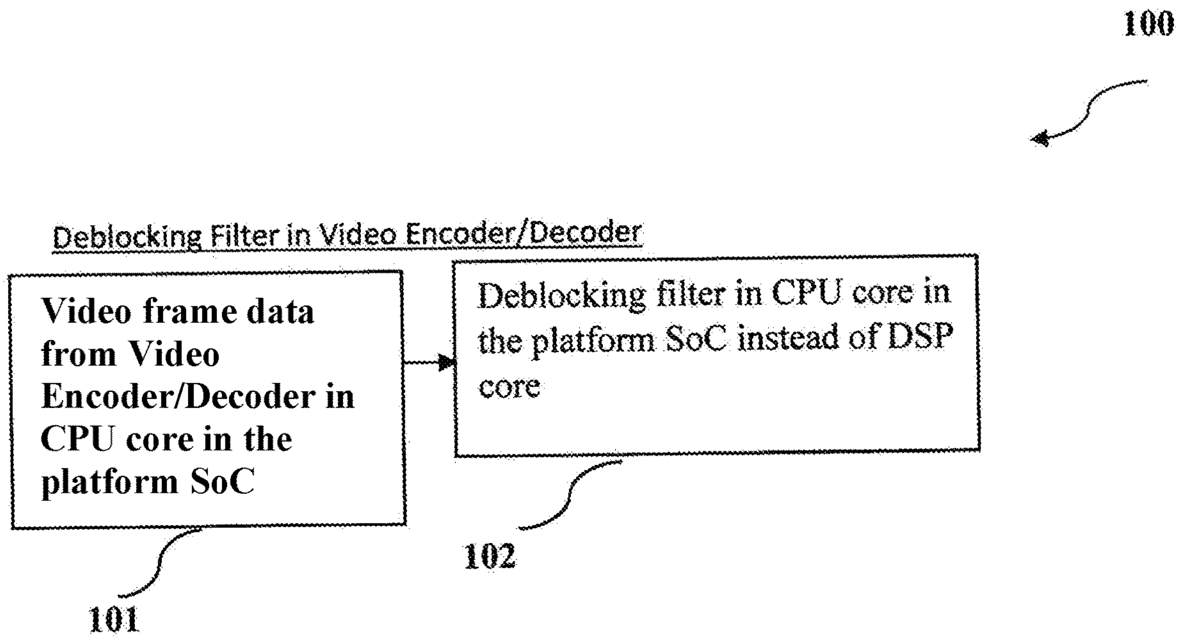
FIG. 1 illustrates a block diagram of a system for implementing video codecs in the platform SoC in mobile devices, according to one embodiment of the invention.

FIG. 1 illustrates a block diagram of a system for implementing video codecs in mobile devices, according to one embodiment of the invention. In a preferred embodiment, the system comprises a CPU core with SIMD extensions (101) which is tasked with Video frame encoding/decoding. The processed video samples are then passed to in-loop filtering/post processing module (deblocking filter) on another CPU with SIMD extensions (102).

The video frame samples are fed to a video codec encoder/decoder module (101). The video codec encoder module is configured to encode the video signal running on a CPU with SIMD extensions. The various coding tools of the digital video compressed standard specification namely intra prediction, Motion Estimation/inter prediction, transform, quantization, bitstream encoding including VLC, CAVLC, CABAC is implemented on the CPU with SIMD extensions. The processing of video frames is pipelined between the CPU and another CPU instead of DSP/VLIW, deblocking filter implemented on CPU core. The current consumption in the SoC in either case (deblocking filter on CPU, DSP) is same while reducing BoM cost significantly in using CPU (102) compared to an implementation of the deblocking filter single or multiple DSP/VLIW core.

The video codec decoder module (101) is configured to decode the received compressed video signals (running on a CPU with SIMD extension). The decoded video samples are then post processed (deblocking filter). The post processing modules (deblocking filter) (102) is implemented in a CPU instead of DSP/VLIW processor.

Figure 2:
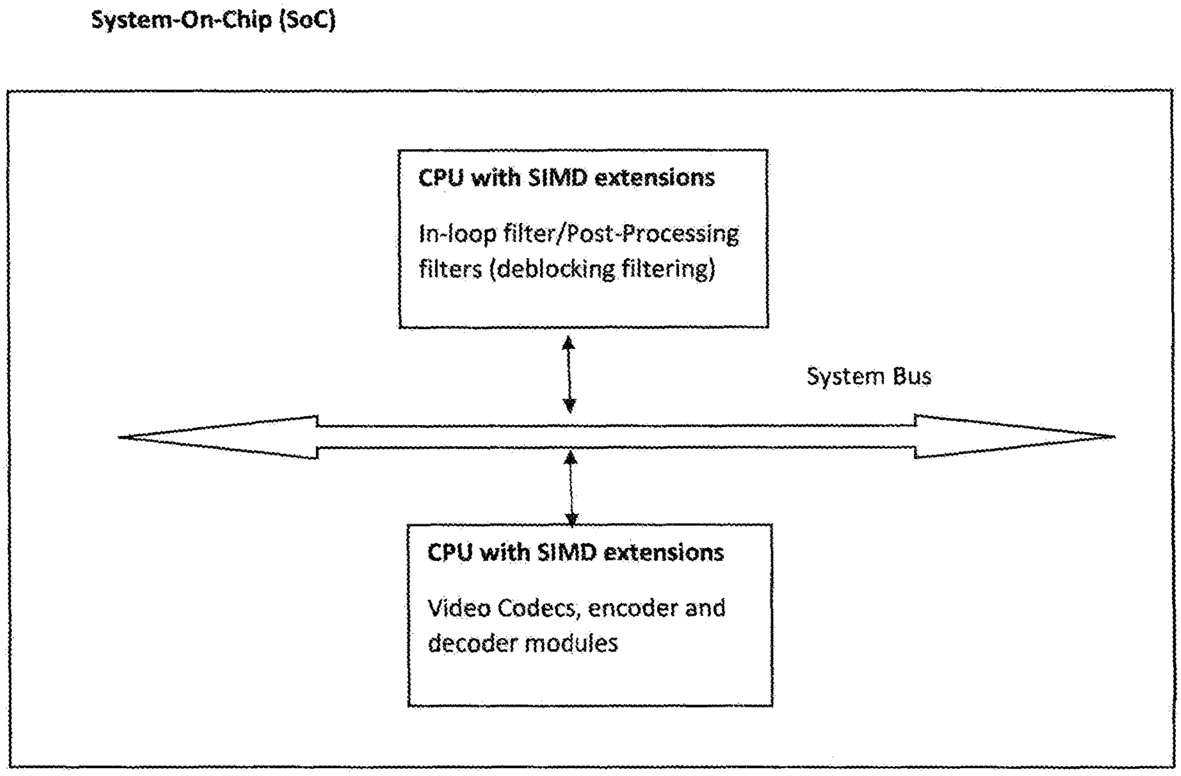
FIG. 2 illustrates method for optimizing BoM cost of platform SoC, according to one embodiment of the invention.
Figure 3:
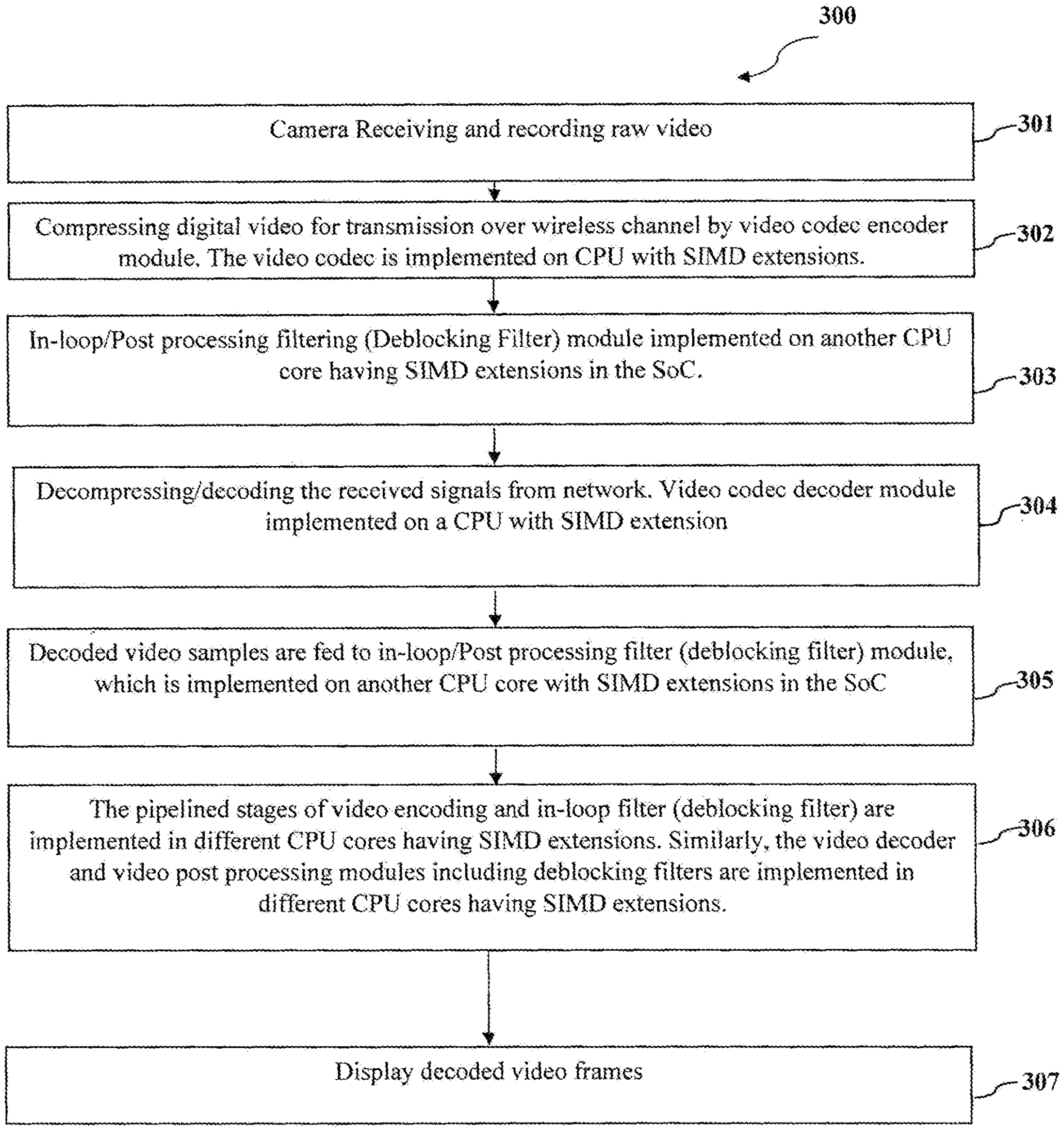
FIG. 3 illustrates method for optimizing BoM cost of platform SoC whilst implementing video codecs in mobile devices, according to one embodiment of the invention.

FIG. 2 In an embodiment of the invention, the pipelined implementation of video codec and post-processing (deblocking filter) modules on different CPU cores respectively results in efficient implementation of video codecs without increase in current consumption whilst reducing BoM cost of platform SoC. The Architecture of the SoC contains multiple CPU with SIMD extensions cores without any DSP/VLIW core. Thus, lower BoM cost platform SoC is built while still maintaining same power consumption in video in the present invention FIG. 3 illustrates the method for optimizing power consumption in video communication in mobile devices, according to one embodiment of the invention. In a preferred embodiment, the method initiates with the step of receiving and recording raw video at step 301.

At step 302, video frame samples are encoded by a video codec encoder module. The video encoder is implemented on CPU with SIMD extensions. The deblocking filter and other post processing is implemented on CPU core at step 303. The current consumption in video call is still the same as compared to DSP core implementation and achieving bit-exact results overcoming the limitation of CPU ISA.

At step 304, the compressed video signal is decoded by the video codec decoder (101).

At step 305, decoded video is deblocking filtered and post-processed to get output video frame (102).

The inventive step in in-loop/post-processing (deblocking) module implemented on CPU with SIMD extensions is described now. The video frame samples are usually 8 bits. 10 bit video samples are supported nowadays. In deblocking module, the block size could vary from 4×4 to 32×32 depending on the video standard. The reference samples are also 8 bit or 10 bit and are subjected to filtering. The output of this is still 8 or 10 bits, and can fit within 16-bit span of a 32-bit register. The filtering operation is 3 tap filter, the intermediate results still within 16-bit span. Turning off saturation is thus safe, and the instruction set can constructed without saturation embedded into it and SIMD optimization is possible, thus saving Bill of Material (BOM) cost and giving similar power performance as in DSP implementation of deblocking filter.

Thus, the present invention provides a method to optimize the BoM cost of platform SoC in mobile device.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Software includes applications and algorithms. Software may be implemented in a smart phone, tablet, or personal computer, in the cloud, on a wearable device, or other computing or processing device. Software may include logs, journals, tables, games, recordings, communications, SMS messages, Web sites, charts, interactive tools, social networks, VOIP (Voice Over Internet Protocol), e-mails, and videos.

In some embodiments, some or all of the functions or process(es) described herein and performed by a computer program that is formed from computer readable program code and that is embodied in a computer readable medium. The phrase "computer readable program code" includes any type of computer code, including source code, object code, executable code, firmware, software, etc. The phrase "computer readable medium" includes any type of medium capable of being accessed by a computer, such as read only memory (ROM), random access memory (RAM), a hard disk drive, a compact disc (CD), a digital video disc (DVD), or any other type of memory.

All publications and patent applications mentioned in this specification are herein incorporated by reference to the same extent as if each individual publication or patent application was specifically and individually indicated to be incorporated by reference.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

I claim:

1. A system (100) for optimizing Bill of Material (BOM) cost and power performance comprising:

a system on chip (SOC) including a plurality of Central Processing Unit (CPU) cores with Single Instruction Multiple Data (SIMD) extensions (101, 102) and excluding any Digital Signal Processor (DSP) core;

a first CPU core of the SOC implementing one or more video encoder/decoder modules;

another CPU core implementing an in-loop deblocking filter, and receiving processed video samples from the first CPU core;

a pipelined implementation between the first CPU cores and another CPU core; and each CPU core having an Arithmetic Logic Unit designed without saturation logic in critical instructions, including Multiply and Accumulate (MAC) and shift instructions, wherein the system generates a bit-exact video processing result on the CPU cores as compared to a result generated using a DSP implementation.

2. The system as claimed in claim 1, wherein the video codec module (101, 102) includes MPEG-1, MPEG-2, MPEG-4, H.264, H.265, AV1, VP8 or VP10 standard video codecs.

3. The system as claimed in claim 1, wherein the BoM cost is reduced compared to an alternative implementation using a Digital Signal Processor/Very Large Instruction Word (DSP/VLIW) core for the in-loop deblocking filter.

4. A method for optimizing Bill of Material (BOM) cost and power performance in a System-on-chip (SOC), wherein the SOC comprises a plurality of Central Processing Unit (CPU) cores with Single Instruction Multiple Data (SIMD) extensions and excludes any Digital Signal Processor (DSP) core, comprising:

receiving and recording (301) raw video;

encoding (302) video frame samples by a video codec encoder module implemented on a first CPU core of the SOC;

post-processing (303) the encoded video samples by implementing an in-loop deblocking filter on another CPU core of the SOC received from the first CPU core;

implementing pipelined processing between the first CPU cores and another CPU core of the SOC; and outputting (305) the post-processed video having a bit-exact result on the CPU cores as compared to a result generated using a DSP implementation, wherein each CPU core having an Arithmetic Logic Unit designed without saturation logic in critical instructions, including Multiply and Accumulate (MAC) and shift instructions.

5. The method as claimed in claim 4, wherein the video codec encoder modules include MPEG-1, MPEG-2, MPEG-4, H.264, H.265, AV1, VP8 or VP10 standard video codecs.

* * * * *